United States Patent Office 3,420,673
Patented Jan. 7, 1969

3,420,673
PROCESS FOR REDUCTION OF COFFEE FOAM
Herbert Guggenheim, Tenafly, N.J., assignor to General Foods Corporation, White Plains, N.Y., a corporation of Delaware
No Drawing. Filed Apr. 5, 1965, Ser. No. 445,712
U.S. Cl. 99—71      2 Claims
Int. Cl. A23f 1/08

ABSTRACT OF THE DISCLOSURE

Foaming of coffee extract due to cooling the hot percolate prior to drying is substantially reduced by subjecting the extract to pressure during said cooling step.

---

This invention relates to a process for preventing or reducing foam in coffee extract.

In the production of soluble coffee a problem exists due to foaming of the extract as it is recovered from the extraction operation. Coffee extract, as it comes from the last percolation column, has a temperature of above 150° F. At this temperature, many of the volatile aromatic compounds released as a gas during percolation are dispersed throughout the extract. At the high temperatures and pressures prevailing during the percolation cycle, foaming of these dispersed gases, as well as any occluded air present in the extract, does not present a serious problem. However, prior to drying the soluble coffee, the extract is usually cooled to improve the quality of the extract and this causes the occluded air and dispersed gases to be released from the extract in the form of a thick foam which appears on the surface of the extract. This foam, which is present in the cold extract, is quite stable and presents difficult processing problems in the weigh and holdup tanks prior to spray-drying. Since the spray-drying of the foam presents obvious problems in density and color, this foam must be eventually separated from the extract prior to the drying operation. Aside from the operating expense required in eliminating foam during the processing of coffee, a serious loss of soluble coffee solids is presented by foaming since it cannot be dried but must be discarded. However, even more important than this is the fact that the volatile compounds released in the form of gases during the extraction operation, are present in the foam and these aromatics are completely lost from the soluble process prior to the drying operation.

It would, therefore, be desirable if a simple method were devised for preventing loss of volatile aromatics and soluble solids due to foaming of the coffee extract prior to drying said coffee.

It has now been discovered that foaming of coffee extract may be substantially reduced and a more aromatic soluble coffee produced by subjecting said extract to pressure, said pressure being sufficient to solubilize the aromatic gases and air dispersed in the extract, and then drying said coffee.

The pressure applied should be above 60 p.s.i.g., preferably about 80–120 p.s.i.g. This pressure may be applied to the extract for the entire period of time between its issuance from the extraction train to the time when it enters the drying chamber and is dried. However, the critical period involved is that point at which the hot extract (having a typical temperature of between 180°–200° F.) as it is drawn from the percolators is cooled to between 40° to 100° F. (about 60° to 90° F.), prior to entering a weigh tank, hold-up tank or similar chamber where foaming and bubbling off of dispersed aromatics and air occurs.

The pressure may be applied to the extract by injecting a pressurized atmosphere of carbon dioxide, nitrogen, helium, argon or other inert gas on the liquid extract while it is being processed prior to drying. Alternatively, the pressure may be developed in the liquid extract system itself by the use of valve means which restrict the flow of extract and thereby increase the pressure in the system.

In the case where the extract is not kept under pressure for the entire period prior to drying, but is only subjected to pressure while being cooled from a heated state to below 100° F., it is desirable to have any aromatic gases or occluded air not dissolved in the extract, after application of this pressure, vented to atmosphere. This will prevent foaming of the extract as it enters the weigh tank or hold-up tank due to the presence of dispersed gases which have not been redissolved in the extract by the application of pressure during cooling.

This invention will now be described by reference to the following specific examples.

EXAMPLE I

Coffee extract having about 26% soluble solids concentration as it issues from an extraction train at a temperature above 180° F. will have about 10–20% by volume of aromatic gases and occluded air dispersed in the extract in the form of insoluble gases. The warm extract is then cooled to about 70° F. in a heat exchanger (cooling tank) whose discharge is throttled so that pressures of between 90 and 100 p.s.i.g. are developed in the heat exchanger. This pressure will serve to solubilize about 50% of the insoluble gases dispersed throughout the liquid extract. The extract is then allowed to flow into a 600 gallon capacity weigh tank where the extract will be found to have about 35 gallons less foam than a control extract which is not subjected to pressure during cooling. The extract when spray-dried will be found to retain certain volatile aromatic compounds not retained in the spray-dried control.

EXAMPLE II

The procedure of Example I is followed with the exception that the pressurized extract is vented to atmosphere by placing a vent tank in between the extract stream from the cooling tank to the weigh tank. In this case, the foam reduction is above 50 gallons in the weigh tank and retention of aromatics is kept the same on spray-drying the extract.

While this invention has been described by reference to specific examples, it is understood to be limited only by the appended claims.

What is claimed is:
1. A process for reducing foam in coffee extract which comprises extracting said coffee at temperatures which release aromatic compounds present in the coffee in the form of insoluble gases, recovering said extract at a temperature above 180° F. to thereby have a dispersion of occluded air and aromatic gases throughout said extract, cooling said extract to between 40° to 100° F. while ap- plying a pressure above 60 p.s.i.g. to solubilize the aromatic gases and occluded air in said extract, and then drying said extract.

2. A process for reducing foam in coffee extract which comprises extracting said coffee at temperatures which release aromatic compounds present in the coffee in the form of insoluble gases, recovering said extract at a temperature above 180° F. to thereby have a dispersion of occluded air and aromatic gases throughout said extract, cooling said extract to between 40° to 100° F. while applying a pressure of at least 80 p.s.i.g. to solubilize a substantial portion of the aromatic gases and occluded air in said extract, venting the cooled extract to atmosphere to release any aromatic gases and occluded air not solubilized, and then spray-drying said extract.

References Cited

UNITED STATES PATENTS

| | | | |
|---|---|---|---|
| 2,975,056 | 3/1961 | Lombardi | 99—71 |
| 1,237,931 | 8/1917 | Malvezin | 99—68 |

OTHER REFERENCES

"Tea and Coffee Trade Journal," September 1960, pp. 28, 87, 94–95.

Berkman et al.: "Emulsions and Foams," 1941, Reinhold Publ. Co., New York, pp. 147 and 266, copy in Gr. 160.

MAURICE W. GREENSTEIN, *Primary Examiner.*

U.S. Cl. X.R.

99—152, 189; 55—87; 252—321